United States Patent [19]

Torres

[11] 4,192,517
[45] Mar. 11, 1980

[54] ANTI-SCALE STUFFING BOX IMPROVEMENT

[75] Inventor: Julio A. Torres, Pecos, Tex.

[73] Assignee: Conoco, Inc., Ponca City, Okla.

[21] Appl. No.: 15,263

[22] Filed: Feb. 26, 1979

[51] Int. Cl.² .............................................. F16J 15/12
[52] U.S. Cl. ..................... 277/24; 277/124; 277/118; 277/121; 277/144; 277/191
[58] Field of Search ............... 277/24, 102, 124, 117, 277/118, 121, 122, 144, 145, 170, 179, 180, 188 R, 188 A, 190, 191

[56] References Cited

U.S. PATENT DOCUMENTS

| | | | |
|---|---|---|---|
| 563,445 | 7/1896 | Bryant | 277/124 X |
| 862,494 | 8/1907 | Martell | 277/118 |
| 2,842,386 | 7/1958 | Regan | 277/102 X |
| 2,974,983 | 3/1961 | Meyer | 277/24 X |
| 3,002,776 | 10/1961 | Tschappat | 277/124 X |
| 3,076,658 | 2/1963 | Leman | 277/121 |
| 3,096,096 | 7/1963 | Banks | 277/121 X |
| 3,334,639 | 8/1967 | Grant | 277/24 X |
| 3,477,730 | 11/1969 | Szcupak et al. | 277/24 |

Primary Examiner—Robert S. Ward, Jr.
Attorney, Agent, or Firm—A. Joe Reinert

[57] ABSTRACT

Buildup of scale on polished rods extending above certain stuffing boxes on wells producing relatively large amounts of brine incidental to oil production in arid regions is prevented by employing a rigid upper wiper ring in combination with a lower retaining ring in combination with a wiper assembly positioned above the stuffing box.

3 Claims, 4 Drawing Figures

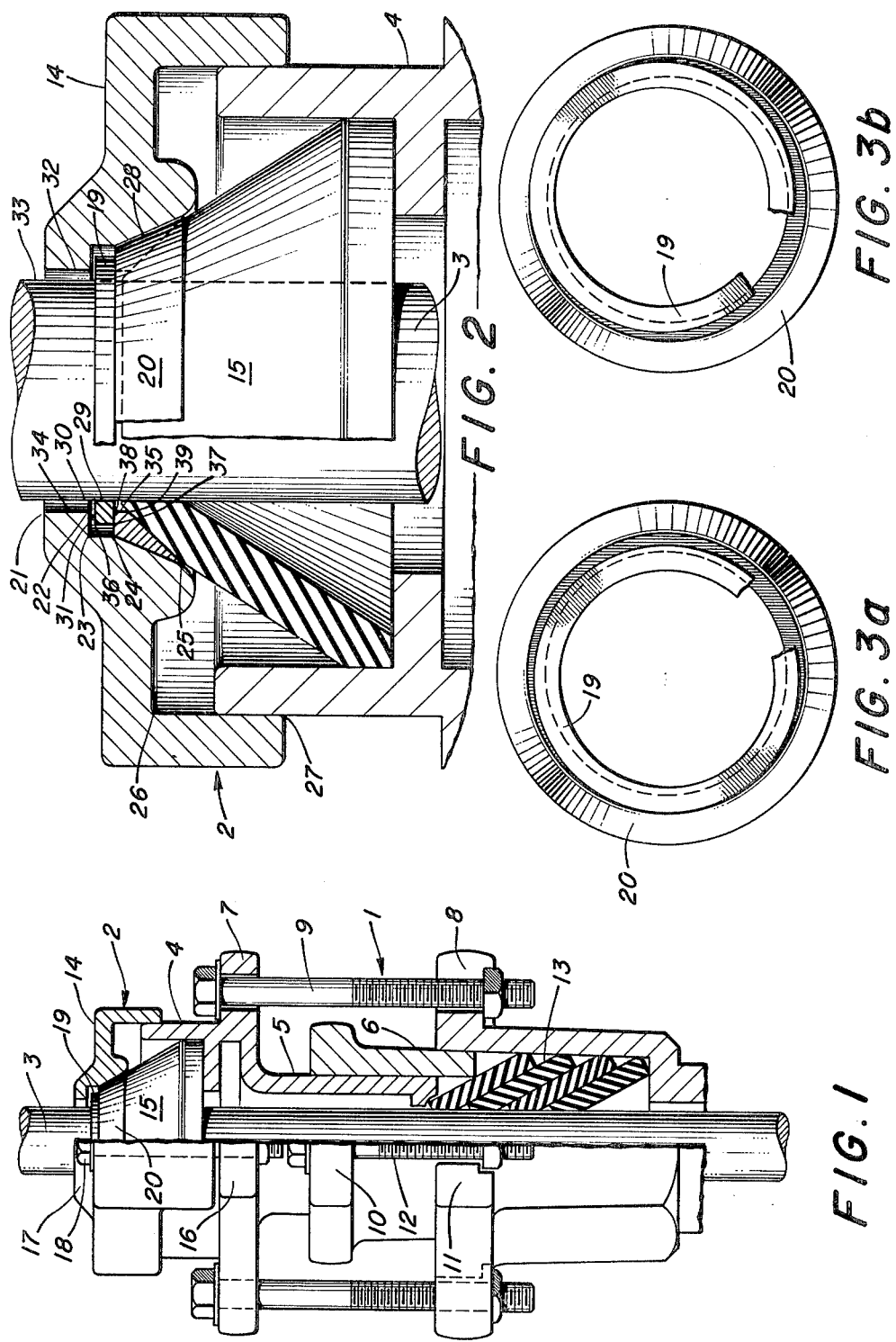

ANTI-SCALE STUFFING BOX IMPROVEMENT

BACKGROUND OF THE INVENTION

The invention relates to prevention of scale buildup on polished rods above stuffing boxes on rod pumping units for producing oil and brine in arid regions.

BRIEF DESCRIPTION OF THE PRIOR ART

The following, inter alia, comprises a prior art statement in accord with the guidance and requirements of 37 CFR 1.5, 1.97, and 1.98.

Artificial lift, and in particular, rod pumping operations for many years have been and are extensively employed to recover hydrocarbons from subterranean formations. FIG. 13, page 10, "Well Servicing and Workover", Introduction to Oil Well Service and Workover, a home study course issued by Petroleum Extension Service, the University of Texas at Austin, Austin, Texas, illustrates a typical rod pumping installation which is very widely employed throughout the oil patch. This figure is hereby incorporated by reference. As is illustrated in the figure, the horsehead on the walking beam of the installation connects through a bridle to a carrier bar and thence to a polished rod which passes through the stuffing box, the casing head, and via a sucker rod string through the tubing string to the rod pump assembly. To effect pumping, the polished rod continuously reciprocates through the stuffing box. The stuffing box prevents fluids from exiting around the polished rod.

Also incorporated herein by reference is page 3519 of the 1978-79 catalog of the J. M. Huber Corporation, Hercules Machine Department, P. O. Box 2831, Borger, Tex. 79007. Illustrated therein are Huber-Hercules polished rod stuffing boxes which are very extensively used in the oil patch, that is, in oil producing areas throughout the United States and the world. The improvement claimed in this application is particularly useful in combination with the single pack model shown in FIG. 1-SP, which is claimed to be used in most oil fields in the free world.

Though the Huber-Hercules polished rod stuffing boxes and stuffing boxes on similar design are excellent equipment having for many years fulfilled their function, a problem exists in wells producing relatively large amounts of brine in arid regions. Inability to obtain an absolutely perfect seal and/or wear on the ring packing elements and wiper seal elements sooner or later results in small amounts of brine clinging to the polished rod as it reciprocates. In arid regions such as far West Texas, the brine evaporates, building up scale on the polished rods. Once scale is built up, the roughness imparted thereby relatively rapidly wears and deteriorates the wiper seal and packing rings, thus resulting in considerable enhanced leakage and even more acceleration of deterioration of the wiper seals and packing rings. The process builds on itself until operations must be shut down and the wiper seals and packing seals replaced in order to prevent substantial brine and hydrocarbons leakage.

Employment of the wiper ring and retainer ring as disclosed and claimed in this invention prevents or largely mitigates the above-described problem.

In distantly related arts, U.S. Pat. Nos. 2,966,376, 3,477,730, 2,974,983, and 2,772,105 all disclose use of scraper rings to prevent buildup of deposits on seal assemblies for shafts associated with machine assemblies and the like. The importance of close tolerance between the scraper ring and the shaft, the importance of maintaining the scraper ring in perpendicular alignment to the long axis of the shaft, and the importance of allowing the scraping ring to move with a motion perpendicular to the long axis of the shaft is disclosed. However, none of the references appear to disclose nor make obvious the improvement which accomplishes results as disclosed and claimed in this application.

A searcher who conducted a pre-examination search relating to this application also cited U.S. Pat. Nos. 1,773,137, 2,743,122, 2,842,386, 2,895,156, 3,129,009, 3,902,215, and 3,334,639. None of these references presently appear to be more closely related than in providing background in related arts. No representations are made as to thoroughness or exhaustiveness of the pre-examination search which was conducted.

OBJECTS OF THE INVENTION

An object of the invention is to provide an improvement associated with stuffing boxes in order to prevent deterioration thereof by scale forming in arid regions where relatively large amounts of brine are produced concurrent with hydrocarbons.

SUMMARY OF THE INVENTION

Brine scaling leading to deterioration of stuffing boxes is prevented by an improvement in combination with a wiper assembly positioned about a reciprocating polished rod; the wiper assembly comprised of a lower housing member, an upper housing member, an upright truncated conoid elastomeric wiper seal positioned in wiping fit about the reciprocating polished rod, and a means for tightening the upper housing member against the lower housing member in a direction axial to the long axis of the polished rod, the wiper assembly situated upstroke of and fastened to or integral with a stuffing box situated about and in sealing fit with the reciprocating rod; the upper housing member having an internal surface defined by rotating a line 360° about the long axis of the polished rod, (a) the line starting at the upper surface of the upper housing member in proximity to the polished rod;

(b) then extending downward substantially parallel to the long axis of the polished rod, (c) then extending outward radially to the long axis of the polished rod, (d) then extending downward substantially parallel to the long axis of the polished rod, (e) then extending generally axially-radially to the long axis such as to be in proximity with the upper sloping axial surface of the truncated conoid wiper seal, (f) then extending in a generally radial direction, and (e) then extending in a generally axial direction; the upper housing member matable with the lower housing member and movable with respect therewith in a direction axial to the long axis of the polished rod; wherein the improvement comprises:

(h) a rigid upper wiper ring in combination with (i) a lower retainer ring; the wiper ring and retainer ring positioned about the polished rod above the truncated end of the conoid wiper seal and within the cavity formed by the housing members of the wiper assembly; the wiper ring having an internal diameter in snug slidable fit with the polished rod and of sufficient closeness to scrape any deposits from the polished rod, having substantially rectangular or square cross sections as viewed in a plane taken radially through the long axis of the polished rod, the radial distance of each cross section being greater than the total radial distance between the surfaces of the polished rod and the surfaces of the upper housing member defined by line (b) extending downward parallel to the long axis of the polished rod (as taken through any radial plane through the long axis of the polished rod), the axial distance of each cross-section being not greater than the axial distance defined by line (b) extending downward parallel to the long axis of the polished rod and not less than about 90 percent of said distance of line (d), the total diameter of the outer surface of the wiper ring not being greater than the diameter defined by the line (d) defining an internal surface in the upper housing member;
the lower retaining ring having an upper surface radial to the long axis of the polished rod, having an inner surface of greater diameter than the diameter of the inner surface of the wiper ring, having an outer surface substantially nestable in the surface of the upper housing defined by line (e) extending axially-radially, and having a fourth lower and inner surface defined by the rotation of a line more radial and less axial than line (e) about the long axis of the polished rod.

BRIEF DESCRIPTION OF THE DRAWINGS

FIG. 1 is a semi-sectioned side view of a prior art polished rod stuffing box having a prior art wiper assembly positioned thereabove and having the wiper ring and retaining ring of the invention emplaced in the wiper assembly.

FIG. 2 is a semi-sectioned side view of the upper portions of the wiper assembly having the inventive wiper ring and retainer ring positioned therein showing the interrelationship of the elements.

FIGS. 3a and 3b are top views showing the wiper ring in association with the retainer ring.

DESCRIPTION OF THE DRAWINGS AND A PREFERRED MODE OF THE INVENTION

The following exemplification and description relating to a presently preferred mode are provided to more fully explain the invention and to provide information to those skilled in the art on how to carry it out. However, it is to be understood that such is not to function as limitation on the invention as described and claimed in the entirety of this application.

Referring to FIG. 1, a semi-sectioned side view of a prior art polished rod stuffing box 1 having a prior art wiper assembly 2 positioned thereabove and integral therewith positioned about a polished rod 3 is shown. Lower housing 4 of the wiper assembly 2 is integral with upper housing member 5 of the stuffing box. Upper housing 5 and middle housing 6 of the stuffing box are tightened together by means of flanges 7, 8, 10, and 11 and tightening bolts 9 and 12 whereby the lower end of upper housing 5 compresses and deforms ring packing elements 13 against the polished rod and the inner surface of the lower housing assembly 8 thus forming an efficient seal about the reciprocating polished rod 3.

Also part of the prior art is wiper assembly 2 comprised of lower housing member 4 integral with the packing box, upper housing member 14 matable over lower housing member 4, upright truncated conoid elastomeric wiper seal 15 emplaced about the polished rod and within the cavity formed by upper housing member 14 and lower housing member 4. Upper housing member 14 can be tightened against lower housing member 4 in a direction axial to the long axis of the polished rod by means of bolt 18 through flanges 16 and 17, thus forming an efficient and adjustable wiper seal about the polished rod. As the wiper seal member 15 wears, compensation can be had by tightening the housing members together to compensate therefor.

Referring now to FIGS. 1 and 2, the inventive rigid upper wiper ring 19 and lower retaining ring 20 are shown positioned in the wiper assembly 2. As is apparent, particularly in FIG. 2, the upper housing member 14 has an internal surface defined by rotating a line 360° about the long axis of the polished rod, the line starting at a point 21 at the upper surface of the upper housing member in proximity to the polished rod, then extending downward parallel to the long axis of the polished rod to a point 22, then extending outward radially to the long axis of the polished rod to a point 23, then extending downward parallel to the long axis of the polished rod to a point 24, then extending axially-radially to the long axis such as to be in proximity with the undeformed upper sloping axial surface of the truncated conoid wiper seal to a point 25, then extending in a generally radial direction to a point 26, and then extending in a generally axial direction to a point 27. The undeformed surface of the truncated conoid elastomeric wiper seal would be along line 24 to 25 if retainer ring 20 of the invention were not emplaced in the wiper assembly.

Wiper ring 19 of the invention is positioned about the polished rod 3 above the truncated end 28 (shown by phantom line) of the truncated conoid elastomeric wiper seal 15 and within the cavity formed by the housing members of the wiper assembly.

The internal surfaces 29 of the wiper ring is in snug slidable fit with the surface 30 of the polished rod and the fit is of sufficient closeness to scrape deposits from the polished rod. The cross-section 31 (as viewed from a plane taken radially through the long axis of the polished rod is of rectangular or square configuration. The radial distance of the cross-section is greater than the total of the radial distances between polished rod surface 33 and surface 32 plus polished rod surface 30 and surface 34. This relationship also holds for the inner surfaces 35 of the retainer ring 20, as is more clearly illustrated in FIGS. 3a and 3b.

The axial distance of the cross-section from point 36 to point 37 is not greater than the axial distance defined by the line extending from point 23 to point 24 parallel to the long axis of the polished rod and is also not less than about 90 percent of the distance of the line from point 23 to point 24. The total diameter of the outer surface of the wiper ring as defined by the radial distance from the long axis of the centered polished rod to the surface swept by the line from point 36 to point 37 is not greater than the diameter defined by the surface swept by line from point 23 to point 24 rotated around the long axis of the centered polished rod.

The lower retainer ring 20 has an upper surface as shown in cross-section defined by the line from point 24 to point 38 which is radial to the long axis of the polished rod, and has an inner surface 35 shown by the line between point 38 and 39 swept around the long axis of the polished rod, and which is greater than the diameter of the inner surface 29 of the wiper ring 19. The outer surface defined by sweeping a line from point 24 to point 25 about the long axis of the polished rod is substantially nestable in the surface of the upper housing member defined in the same way. The fourth and lower surface of the retainer ring defined by sweeping a plane defined by a line between point 25 and point 39 about the long axis of the polished rod, the line being more radial and less axial than the line between point 24 and point 25, effects deflection of the upper portion of the outer surface of the elastomeric wiper seal inward as shown in the figure. This holds the retainer ring firmly in place. It also holds the upper surface of the retainer ring firmly perpendicular to the long axis of the polished rod. The polished rod is free to give in a direction perpendicular to its long axis to compensate for imperfections in alignment while the wiper ring 19 follows such movement while being forced to remain substantially completely aligned about the polished rod. This prevents binding and undue wear on the wiper ring and polished rod as well as preventing binding by loss of alignment about the polished rod. The wiper ring 19 is also free to rotate on the polished rod, thus preventing uneven wear on the ring or polished rod.

The above description in combination with the figures disclose the manner in which the inventive wiper ring and retainer ring operate in combination with the prior art elements to carry out the inventive result of preventing buildup of deposits on the polished rod, maintaining the wiper ring in perpendicular alignment to the long axis of the polished rod, allowing the wiper ring to move with a perpendicular motion to the long axis of the polished rod as the polished rod reciprocates in response to the motion of the horsehead on the walking beam, and allowing rotation of the wiper ring about the polished rod.

The wiper ring and retainer ring can be fabricated by any conventional means such as turning on a lath, stamping, molding, and the like. Any material sufficiently hard and of sufficient rigidity to maintain the polished rod free to scale can be employed. It is preferred to employ materials which are not corroded by the brine-air operating environment. The wiper ring should not be of greater hardness than the polished rod in order to prevent the possibility of excessive wear or scoring of the polished rod.

Some examples of suitable materials for fabrication of the wiper ring include phosphor-bronze, brass, stainless steel, engineering plastics, and the like. According to one presently preferred mode, the rings are fabricated of bronze or brass.

By way of further exemplification, a wiper ring and retainer ring are emplaced in the wiper assembly of a Huber-Hercules polished rod stuffing box as shown in the figures. The stuffing box is employed on a lease in West Texas. Prior pumping experience with the unit has included frequent replacement of the packing and wiper seals due to scale formation on the polished rod. After emplacement of the wiper ring and retainer ring as shown in the figures, the frequency of necessity for replacement is drastically reduced.

I claim:

1. In combination with a wiper assembly positioned about a reciprocating polished rod; the wiper assembly comprised of a lower housing member, an upper housing member, an upright truncated conoid elastomeric wiper seal positioned in wiping fit about the reciprocating polished rod, and a means for tightening the upper housing member against the lower housing member in a direction axial to the long axis of the polished rod, the wiper assembly situated upstroke of and fastened to or integral with a stuffing box situated about and in sealing fit with the reciprocating polished rod;
the upper housing member having an internal surface defined by rotating a line 360° about the long axis of the polished rod,
  (a) the line starting at the upper surface of the upper housing member in proximity to the polished rod,
  (b) then extending downward parallel to the long axis of the polished rod,
  (c) then extending outward radially to the long axis of the polished rod,
  (d) then extending downward parallel to the long axis of the polished rod,
  (e) then extending axially-radially to the long axis such as to be in proximity with the upper sloping axial surface of the truncated conoid wiper seal,
  (f) then extending in a generally radial direction, and
  (e) then extending in a generally axial direction; the upper housing member matable with the lower housing member and movable with respect therewith in a direction axial to the long axis of the polished rod;
the improvement comprising:
  (h) a rigid upper wiper ring in combination with
  (i) a rigid lower retainer ring; the wiper ring and retainer ring positioned about
the polished rod above the truncated end of the conoid wiper seal and within the cavity formed by the housing members of the wiper assembly;
the wiper ring having an internal diameter in snug slidable fit with the polished rod and of sufficient closeness to scrape any deposits from the polished rod, having substantially rectangular or square cross-sections as viewed in a plane taken radially through the long axis of the polished rod, the radial distance of each cross-section being greater than the total radial distance between the surfaces of the polished rod and the surfaces of the upper housing member defined by rotating line (b) extending downward parallel to the long axis of the polished rod as taken through any radial plane through the long axis of the polished rod, the axial distance of the cross-section being not greater than the axial distance defined by line (d) extending downward parallel to the long axis of the polished rod and not less than about 90 percent of said distance of line (d), the total diameter of the outer surface of the wiper ring not being greater than the diameter defined by rotating line (d) defining an internal surface in the upper housing member;
the lower retaining ring having an upper surface radial to the long axis of the polished rod, having an inner surface of greater diameter than the diameter of the inner surface of the wiper ring, having an outer surface substantially nestable in the surface of the upper housing member defined by line (e) extending axially-radially, and having a fourth lower and inner surface defined by the rotation of a line more radial and less axial than line (e) about the long axis of the polished rod.

2. The improvement of claim 1 in combination with the upper wiper assembly integral with a commercially available Huber-Hercules polished rod stuffing box.

3. The improvement of claim 1 wherein the upper wiper ring is fabricated of bronze or brass.

* * * * *